US006735032B2

(12) United States Patent
Dunn et al.

(10) Patent No.: US 6,735,032 B2
(45) Date of Patent: May 11, 2004

(54) SERVO WRITE TIMING GENERATION IN A MULTI-ACTUATOR DISK DRIVE

(75) Inventors: George Anthony Dunn, San Jose, CA (US); Scott Arthur Thomas, San Jose, CA (US)

(73) Assignee: International Business Machines, Inc., Armonk, NY (US)

( * ) Notice: Subject to any disclaimer, the term of this patent is extended or adjusted under 35 U.S.C. 154(b) by 305 days.

(21) Appl. No.: 09/835,675

(22) Filed: Apr. 16, 2001

(65) Prior Publication Data

US 2002/0149867 A1 Oct. 17, 2002

(51) Int. Cl.⁷ .............................. G11B 5/09; G11B 5/596
(52) U.S. Cl. .................. 360/51; 360/78.12; 360/78.14; 360/78.04; 360/77.08; 360/48; 360/31
(58) Field of Search .............................. 360/75, 51, 48, 360/78.12, 78.04, 78.14, 77.08, 31, 77.02, 77.07, 77.05

(56) References Cited

U.S. PATENT DOCUMENTS

| | | | |
|---|---|---|---|
| 4,371,902 A | 2/1983 | Baxter et al. | 360/75 |
| 5,223,993 A | 6/1993 | Squires et al. | 360/77.08 |
| 5,293,282 A | 3/1994 | Squires et al. | 360/77.08 |
| 5,333,140 A * | 7/1994 | Moraru et al. | 714/719 |
| 5,339,204 A * | 8/1994 | James et al. | 360/51 |
| 5,761,007 A | 6/1998 | Price et al. | 360/106 |
| 5,796,541 A | 8/1998 | Stein et al. | 360/75 |
| 5,894,374 A * | 4/1999 | Moraru | 360/75 |
| 5,963,391 A * | 10/1999 | Nakagawa et al. | 360/75 |
| 6,057,990 A * | 5/2000 | Gilovich | 360/106 |
| 6,388,833 B1 * | 5/2002 | Golowka et al. | 360/77.02 |
| 6,628,471 B1 * | 9/2003 | Min et al. | 360/75 |

FOREIGN PATENT DOCUMENTS

| | | | |
|---|---|---|---|
| JP | 1-184676 | 7/1989 | G11B/21/10 |
| JP | 1-253814 | 10/1989 | G11B/5/596 |
| JP | 6-44710 | 2/1994 | G11B/21/10 |
| JP | 6-44711 | 2/1994 | G11B/21/10 |
| JP | 10199173 A | 7/1998 | G11B/21/10 |

OTHER PUBLICATIONS

"Regenerative Clock Technique For Servo Track Writers", IBM Technical Disclosure Bulletin, v. 33 n.5, pp. 31Off (Oct. 1990).

"The advantages of IBM servowrite self–timing technology", IBM Whitepaper (www pub<= Nov. 23, 1999).

* cited by examiner

*Primary Examiner*—David Hudspeth
*Assistant Examiner*—Natalia Figueroa
(74) *Attorney, Agent, or Firm*—Walter W. Duft (57) ABSTRACT

A multi-actuator disk storage device has at least two actuators respectively mounting plural product heads. Servo writing is performed using the product heads themselves. A first servo write operation is performed that includes operating a product head of the first actuator as a first clock head to generate first clock reference information for the product heads of the second actuator, which are operated as servo write heads to perform servo writing of disk areas associated with the second actuator using the first clock reference information. To servo write disk areas associated with the first actuator, a second servo write operation is performed. This operation includes operating a product head of the second actuator as a second clock head to generate second clock reference information for the product heads of the first actuator, which are operated as a servo write heads to perform servo writing using the second clock reference information.

21 Claims, 10 Drawing Sheets

SERVO WRITE TIMING GENERATION IN A MULTI-ACTUATOR DISK DRIVE

BACKGROUND OF THE INVENTION

1. Field of the Invention

This invention relates to disk drives, and particularly disk drives of the multi-actuator variety. Still more particularly, the invention concerns the generation of timing information for writing permanent embedded servo information in a multi-actuator disk drive.

2. Description of the Prior Art

During disk drive manufacture, the writing of embedded servo sectors requires precise reference timing in order to adequately phase align the servo patterns when moving from one track to the next. This timing function has traditionally been performed by an external clock head that flies at a fixed location over a surface of one of the disk platters (e.g., at its outer diameter) during the servo write process. The clock head either writes and then reads its own timing information, or reads previously written timing information.

A disadvantage of external clock head servo writing is that it is not possible to servo write a sealed disk file insofar as the clock head needs to physically access the disk surface. This requirement makes conventional external clock head servo writing relatively complicated. The clock head must first be loaded onto the disk file that is to be servo written. This entails introducing the clock head through an opening that is formed in the disk file base casting. Following servo writing, the clock head must be unloaded and the opening in the disk file base casting must be closed to seal the disk file.

Because of their repeated loading and unloading on successive disk files, clock heads have a limited life and require regular replacement. If they become contaminated or damaged prior to replacement, they can destroy a good disk file or propagate contamination from one disk file to another.

An additional disadvantage of external clock head servo writing is that disk real estate which could be otherwise utilized for data storage is typically used to hold the timing information.

One prior art alternative to external clock head servo writing is to use self-propagating clock tracks in a scheme known as NCH (No Clock Head) servo writing. According to this technology, a product head used for servo writing is first positioned at a known reference location, such as the disk outer diameter. There, it writes a track containing clock information. The product head then steps progressively across the disk surface and, in iterative fashion, writes servo information as well as new clock information while using clock information written in a previous iteration for timing. A disadvantage of self-propagating clock track servo writing is that the process requires an additional revolution of the disk on many tracks to measure the time intervals under most combinations of head geometry and slider skew.

Multi-actuator disk drives have been developed in which the drive actuators are assigned to carry out data storage operations on mutually-exclusive disk areas. An example of such a drive is shown in commonly assigned U.S. Pat. No. 5,761,007. This drive comprises a pair of actuators that are mounted for independent rotation about a common pivotal axis. The principal advantage of multi-actuator drives of this type is that more than one actuator is used to access disk real estate normally covered by a single actuator, which increases access times and data transfer rates. As far as known, however, conventional multi-actuator disk drives of the foregoing type, including the dual-actuator drive of U.S. Pat. No. 5,761,007, use conventional servo writing techniques, and thus suffer from the disadvantages referred to above.

It is submitted that improvements in servo write timing generation are needed in order to expeditiously perform servo writing, particularly in a multi-actuator disk drive production environment. What is required is a servo write method that obviates the need for an external clock head or NCH servo write techniques, is relatively simple in design, and which maximizes the amount of disk real estate available for data storage.

SUMMARY OF THE INVENTION

The foregoing problems are solved and an advance in the art is obtained by a method in which a multi-actuator disk file having at least two actuators respectively mounting plural product heads is written with embedded servo information using the product heads themselves. A first servo write operation is initially performed that includes operating a product head of a first one of the actuators as a first clock head to generate first clock reference information. Using the first clock reference information, the product heads of a second one of the actuators are operated as servo write heads to perform servo writing of disk areas associated with the second actuator. Following the first servo write operation, disk areas associated with the first actuator are servo written using a second servo write operation. This operation includes operating a product head of the second actuator as a second clock head to generate second clock reference information. Using the second clock reference information, the product heads of the first actuator are operated as servo write heads to perform servo writing of the disk areas associated with the second actuator.

In preferred embodiments of the invention, the clock reference information generating steps include positioning the acting clock heads at disk data area edges. This positioning may be accomplished by biasing the actuators carrying the clock heads against actuator crash stops or other positioning members. Alternatively, the clock heads can be positioned by servoing. The timing information read by the clock heads may represent clock tracks, timing triggers or other indicia. Such information may either be pre-written on the disk or written and then read back by the clock heads themselves.

If desired, the second clock head can write the second timing information using the first timing information. In that case, the first clock head will read the first timing information while the second clock head writes the second timing information in a predetermined tangential orientation relative to the first timing information. This will provide timing alignment between the actuators.

In cases where the disk drive includes more than two actuators, the first servo write operation will include operating a product head of a first actuator as a first clock head while the product heads of one or more of the plural remaining actuators perform servo writing. The second servo write operation will then include operating one of the product heads already used for servo writing as a second clock head while the product heads of the first actuator, and any remaining actuators, perform servo writing.

In another aspect of the invention, a disk drive is provided having multiple actuators respectively mounting plural product heads that read and write information on associated disk areas. At least two of the disk areas may have first and second timing information respectively recorded thereon and all of the disk areas have servo sectors recorded thereon according to the above-described servo writing method.

In a further aspect of the invention, a system is provided for servo writing a multiple actuator disk file. Part of the servo write system includes components of the disk file, including the disk assembly, a first actuator having product heads that access a first portion of the disk assembly, a second actuator having product heads that access a second portion of the disk assembly, and a disk drive controller. The remainder of the servo write system includes a programmable data processing host that is external to the disk file but communicates therewith via a control cable, and a servo write control program that may run as an external software program on the host processor, as an internal firmware program on the drive controller, or a combination of both. The servo write control program includes program instructions for performing servo writing in the manner described above.

BRIEF DESCRIPTION OF THE DRAWINGS

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
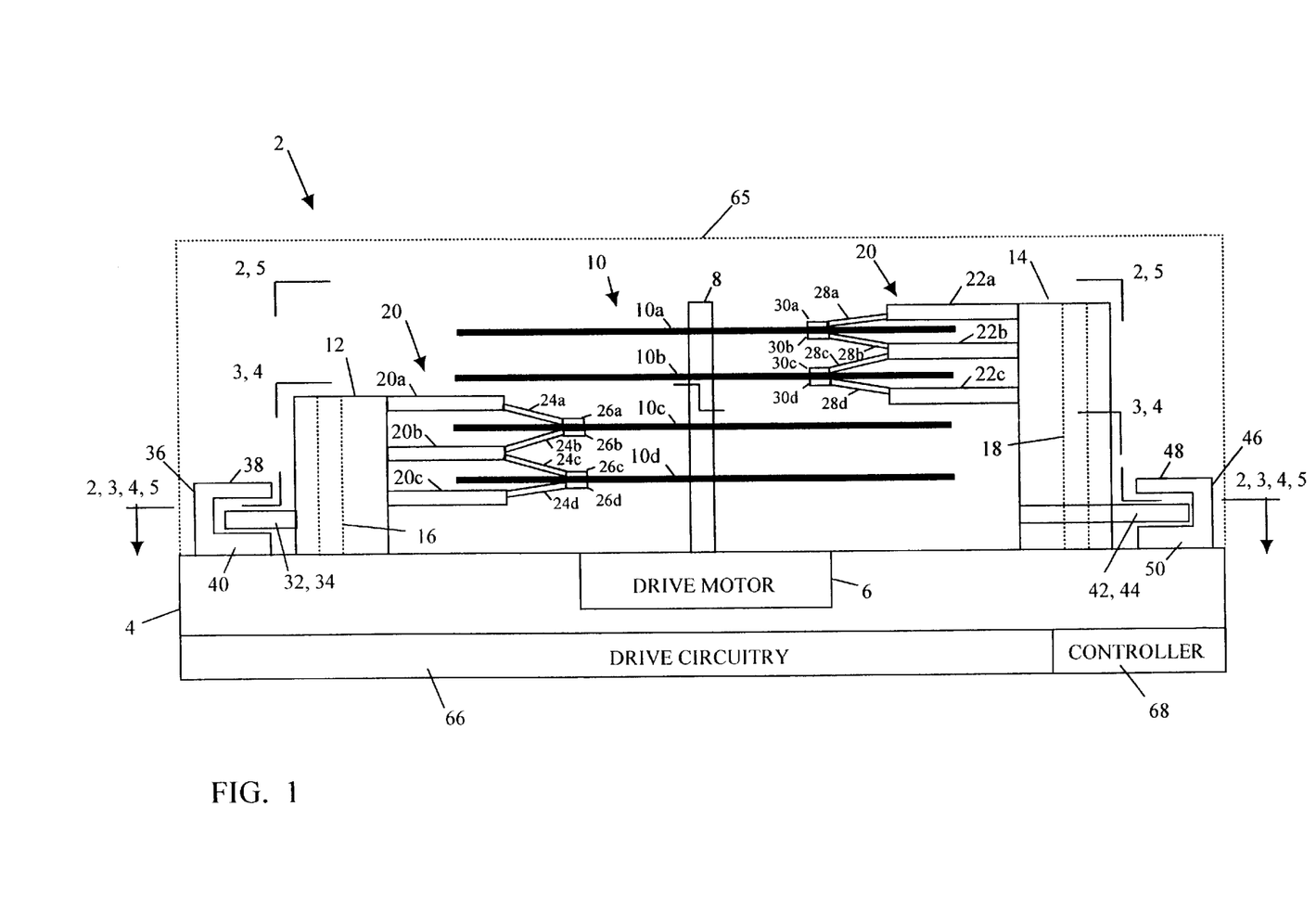
FIG. 1 is a simplified schematic side elevation view showing a multi-actuator disk file adapted to perform servo writing timing generation in accordance with the invention.
Figure 8:
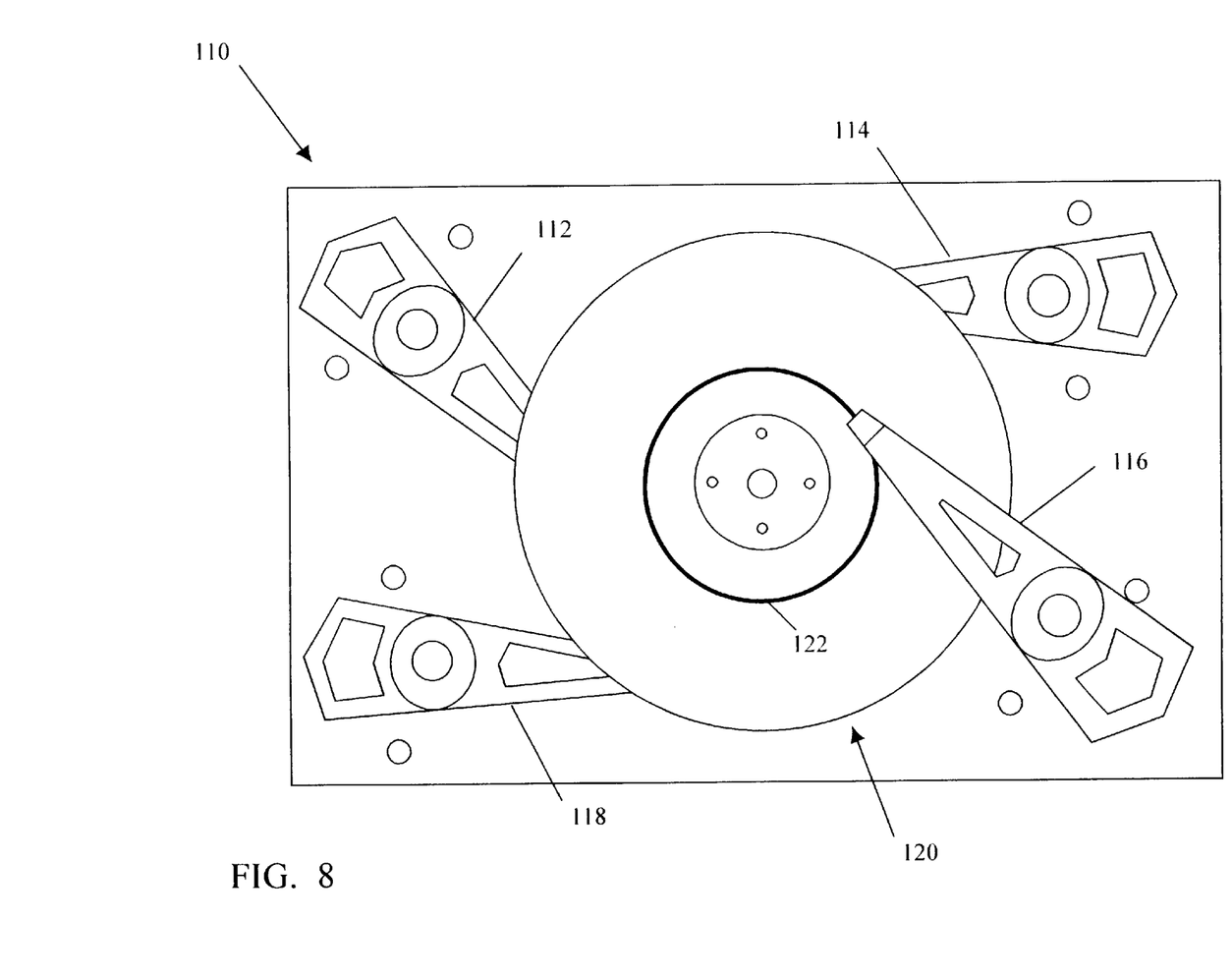
FIG. 8 is a simplified schematic plan view of a modified disk file showing the use of additional actuators.

Turning now to the figures, wherein like reference numerals represent like elements in all of the several views, FIG. 1 illustrates an exemplary disk file (disk drive) 2 that may be used to perform servo writing in accordance with the invention. Note that the disk file 2 is shown in greatly simplified schematic form, with only those construction details that are necessary for an understanding of the invention being shown. As to these illustrated components, it should be understood that all are conventional in nature unless otherwise indicated below. It should likewise be understood that the manner of construction of the disk file 2 could be varied in many significant ways without departing from the scope of the invention. By way of example, FIGS. 8 and 9, described in detail below, represent two such construction variants.

The disk file 2 conventionally includes a base casting 4, made from cast aluminum or other suitable material, that mounts a conventional spindle drive motor 6 having an associated drive spindle 8. A disk assembly 10 includes multiple disk platters 10a, 10b, 10c and 10d. As is conventional, these disk platters are coaxially mounted on the drive spindle 8 for high speed rotation therewith in a spaced vertically stacked arrangement. Although four disk platters are shown in the disk assembly 10, it will be appreciated that more, or fewer, disk platters could be used, depending on the data storage requirements of the disk file 2. The disk platters 10a, 10b, 10c and 10d can be formed from any suitable materials of a type usually found in disk drive magnetic disk assemblies. In particular, the disk platters 10a, 10b, 10c and 10d will be formed from a suitable disk substrate with appropriate coatings being applied thereto such that at least one, and preferably both, of the upper and lower surfaces of each platter are magnetically encodable and aerodynamically configured for high speed transducer interaction.

Data access to the disk assembly 10 is achieved with the aid of a pair of actuators 12 and 14. The actuators 12 and 14 are respectively pivotally mounted on stationary pivot shafts 16 and 18, which are secured in conventional fashion to the base 4. The actuators 12 and 14 respectively comprise multiple actuator arms, generally indicated at 20 and 22, which interact with corresponding sets of the disk platters 10a, 10b, 10c or 10d. In particular, the actuator 12 includes arms 20a, 20b and 20c that are associated with the disk platters 10c and 10d. The actuator 14 similarly includes arms 22a, 22b and 22c that are associated with the disk platters 10a and 10b. Each of the actuator arms 20a–c and 22a–c mounts either one or two load beams (also known as suspensions) that respectively support magnetic read/write heads. The load beams of the actuator 12 are shown by reference numerals 24a, 24b, 24c and 24d. These load beams respectively carry read/write heads 26a, 26b, 26c and 26d, each of which conventionally comprises a pair of transducers that are respectively adapted to read and write information on an associated disk surface. The load beams of the actuator 14 are shown by reference numerals 28a, 28b, 28c and 28d. These load beams respectively carry read/write heads 30a, 30b, 30c and 30d that are identical in construction to the read/write heads 26a–d. Because the read/write heads 26a–d and 30a–d are used for normal read/write operations of the disk file 2, they will be referred to herein as "product heads."

As is well known in the art, due to the rotational motion of the disk assembly 10 and the ability of the actuators 12 and 14 to pivot about the stationary shafts 16 and 18, the product heads 26a–d and 30a–d are able to collectively trace concentric tracks on each of the disk platters 10a, 10b, 10c and 10d. According to conventional disk drive nomenclature, each set of vertically aligned tracks on all of the disk platters 10a, 10b, 10c and 10d defines a "cylinder."

It will be appreciated that although each actuator 12 and 14 is shown to carry product heads that access corresponding sets of the disk platters of the disk assembly 10, this particular configuration is not necessary to the operation of the invention. Indeed, an actuator configuration wherein the actuators 12 and 14 simultaneously access all of the disk platters 10a–d could also be used. Notwithstanding such an arrangement, the actuators 12 and 14 would typically be responsible for performing data operations on mutually exclusive portions of each disk platter so that the speed advantages of using multiple actuators can be fully realized. By way of example, the actuator 12 could be responsible for a first set of cylinders on the disk platters 10a, 10b, 10c and 10d, while the actuator 14 is responsible for a second set of cylinders of the disk platters 10a, 10b, 10c and 10d.

Each actuator 12 and 14 is adapted to be driven in conventional fashion to pivot about the stationary shafts 16 and 18. Thus, as can be seen in any of FIGS. 2–5, the actuator 12 carries a support 32 that mounts the usual voice coil 34. The voice coil 34 is adapted to magnetically interact with a magnetic circuit assembly 36 having respective upper and lower magnets 38 and 40 (see FIG. 1). The actuator 14 similarly carries a support 42 that mounts a voice coil 44. The voice coil 44 is adapted to magnetically interact with a magnetic circuit assembly 46 having respective upper and lower magnets 48 and 50 (see FIG. 1). As is well known in the art, by passing a variable current through the voice coils 34 and 44, their magnetic interaction with the magnetic circuit assemblies 36 and 46 can be controlled such that the actuators 12 and 14 are pivotally positioned to desired radial locations relative to the drive spindle 8. This allows the product heads 26a–d and 30a–d to be located over the data holding portions of the disk assembly 10 and selectively moved to desired track locations.

With continued reference to any of FIGS. 2–5, it will be seen that pairs of conventional crash stops 52a/52b and 54a/54b are respectively associated with the actuators 12 and 14. More particularly, respective inner and outer crash stops 52a and 52b are positioned to engage the support 32 of the actuator 12, while respective inner and outer crash stops 54a and 54b are positioned to engage the support 42 of the actuator 14. The crash stops 52 and 54 limit the pivotal motion of the actuators 12 and 14. This range of pivotal motion is sufficient to allow the product heads 26a–d and 30a–d to collectively access a data zone 56 of the disk assembly 10. The outer radial extent of the data zone 56 is shown at the circumferential location 58 while the inner radial extent of the data zone 56 is shown at the circumferential location 60. An area 62 between the circumferential location 60 and the innermost edge of the storage media portion of the disk assembly 10, shown at 64, represents a "no-data" zone.

Returning now to FIG. 1, the actuators 12 and 14, the disk assembly 10, and all related mechanical components of the disk file 2, are covered by a conventional sealing enclosure 65 that isolates these components from dust and other environmental elements that would otherwise contaminate, degrade and destroy the surfaces of the disk platters 10a, 10b, 10c and 10d.

Figure 6:
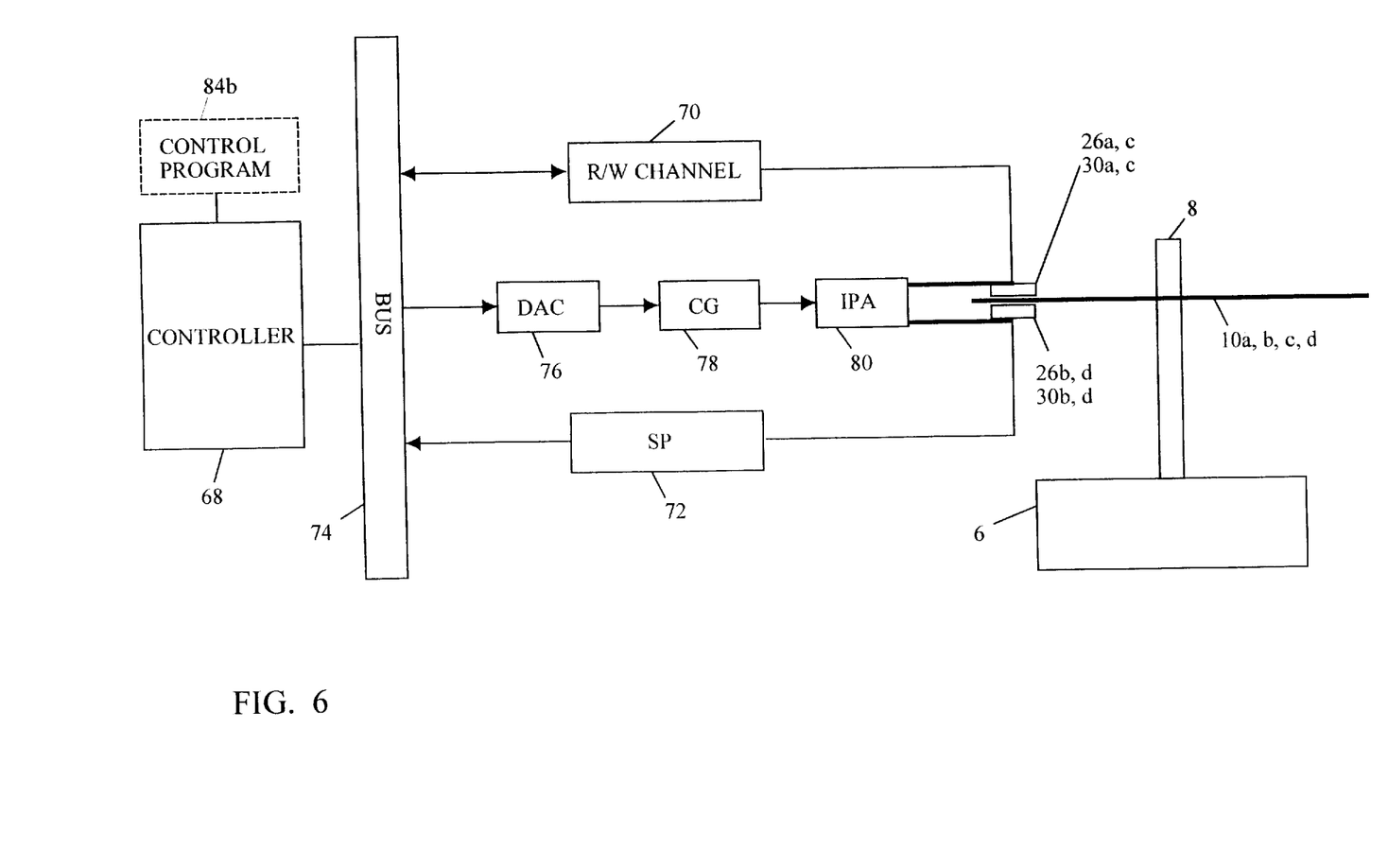
FIG. 6 is a functional block diagram showing the servo systems and data read/write systems of the disk file of FIG. 1.

The disk file 2 further includes a conventional circuit board 66 that mounts, among other things, a disk drive controller system 68 (which may comprise one or more microprocessors, memory and logic devices, firmware routines, etc.) and other conventional drive circuitry. In particular, as shown in FIG. 6, each of the product heads 26a–d and 30a–d is electrically connected to a conventional Read/Write (R/W) channel circuit 70 and to a conventional closed-loop servo positioning circuit (SP) 72. The R/W channel circuit 70 and the SP circuit 72 communicate with the controller 68 via a conventional bus 74. The actuators 12 and 14 are each controlled to move to desired track locations via a digital-to-analog converter (DAC) 76, a compensator gain (CG) circuit 78, and an integrating power amplifier (IPA) 80. These circuits also communicate with the controller 68 via the bus 74. Insofar as the design and operational characteristics of each of the foregoing circuit elements are well known in the art, these components will not be described further herein.

Having presented the salient structural and electrical characteristics of the disk file 2, the operational steps used to perform servo writing in accordance with the invention may now be described. For this discussion, the flow diagram of FIGS. 7A and 7B will be used to identify the various operational steps of the servo write process, and the illustrations of FIGS. 1–5 will be referenced to show the operation of the actuators 12 and 14 during each step.

Figure 2:
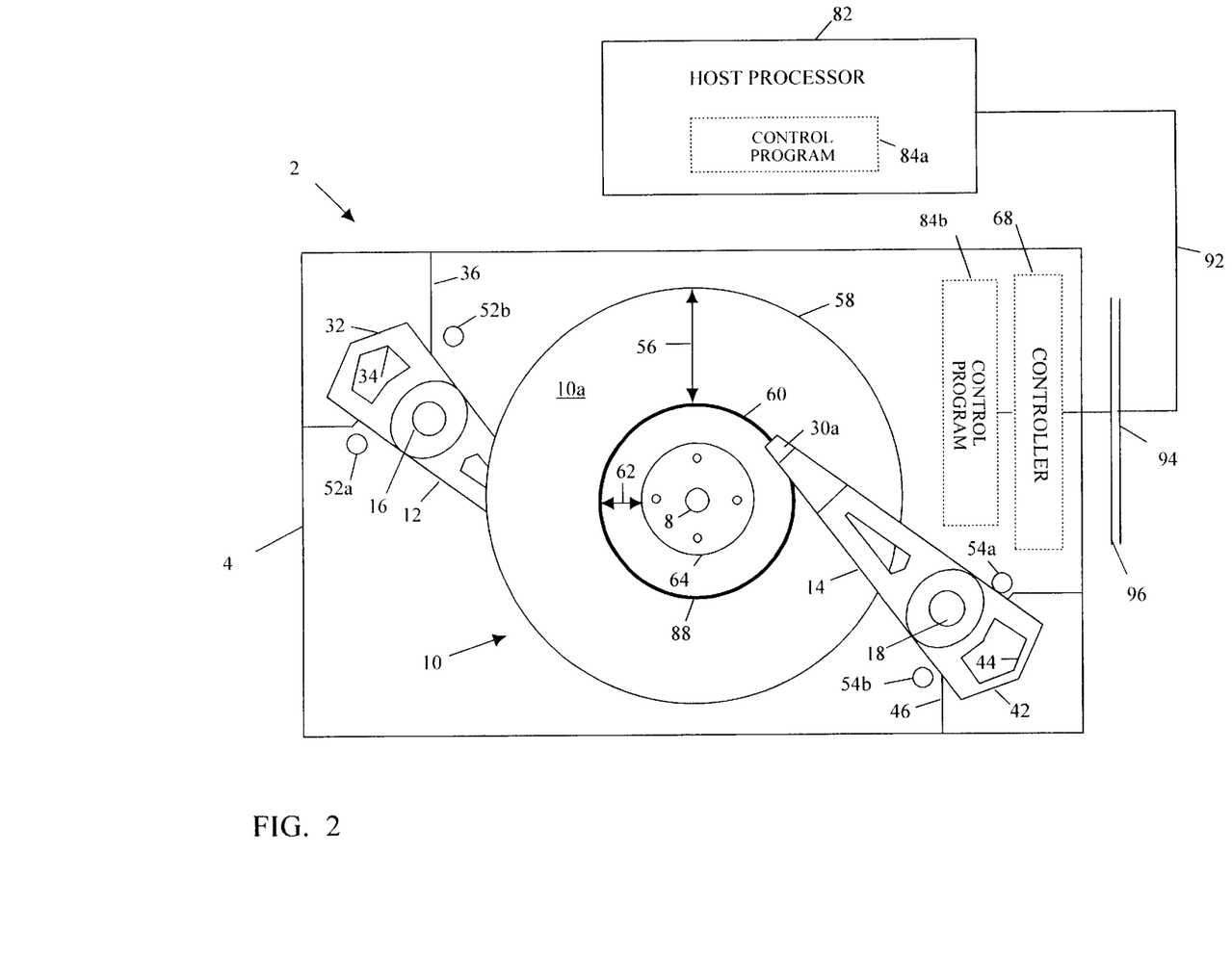
FIG. 2 is a cross-sectional view taken along line 2—2 in FIG. 1, with the drive actuators positioned to perform a first servo write operation.
Figure 3:
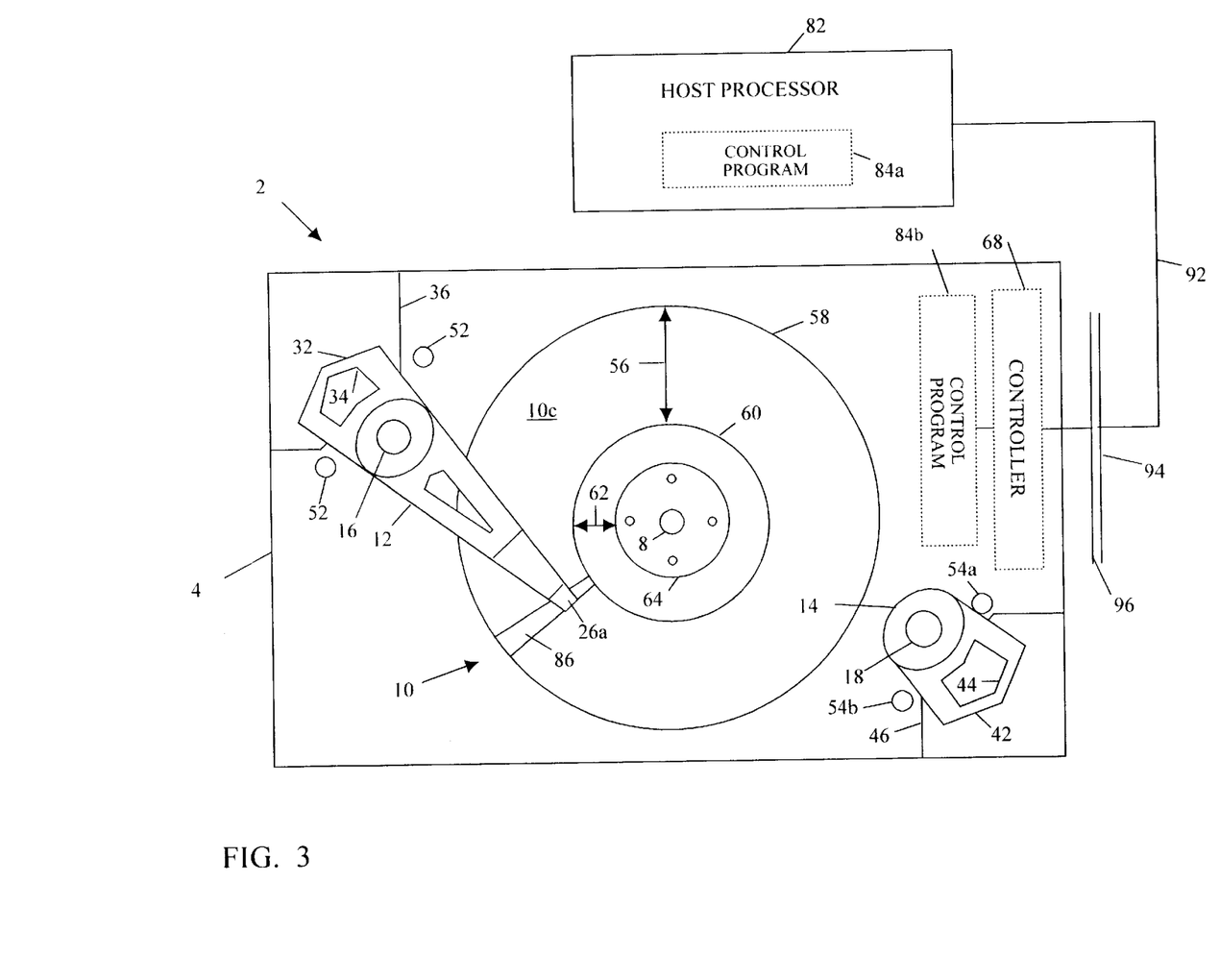
FIG. 3 is a cross-sectional view taken along line 3—3 in FIG. 1, with the drive actuators positioned to perform the first servo write operation.
Figure 4:
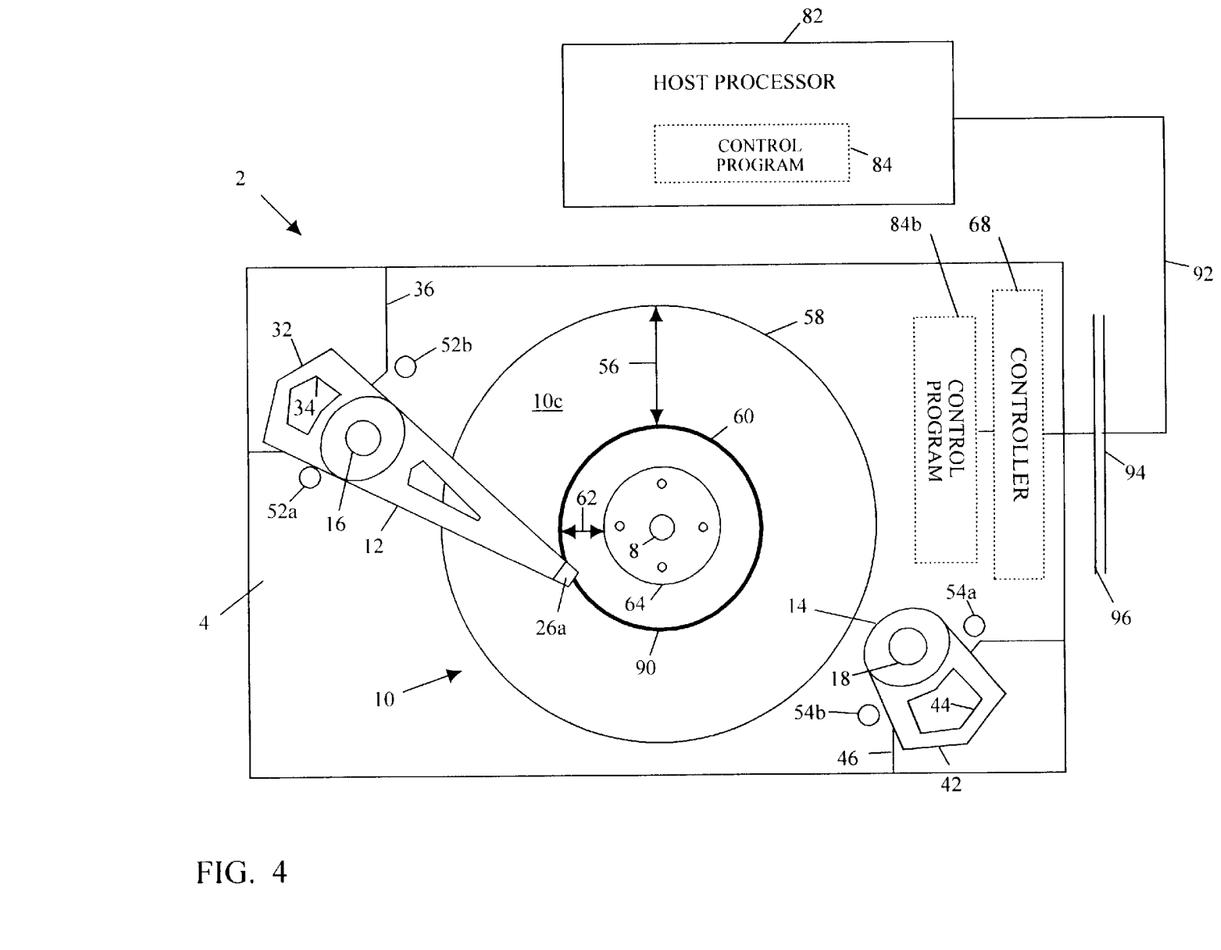
FIG. 4 is a cross-sectional view taken along line 4—4 in FIG. 1, with the drive actuators positioned to perform a second servo write operation.
Figure 5:
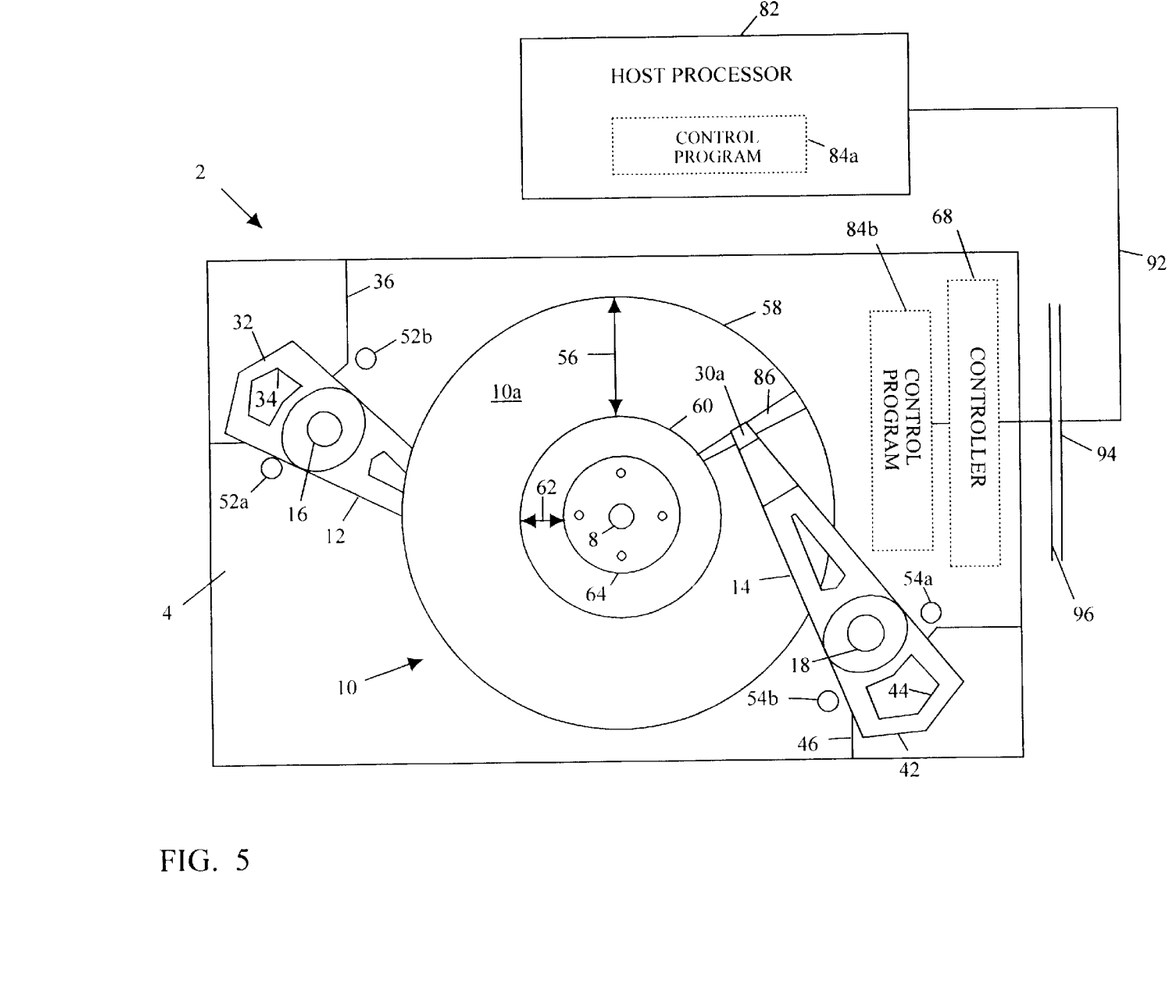
FIG. 5 is a cross-sectional view taken along line 5—5 in FIG. 1, with the drive actuators positioned to perform the second servo write operation.

As can be seen in any of FIGS. 2–5, when it is desired to servo write the disk file 2 as part of the manufacture thereof, the disk file is connected to a servo write data processing host 82 to create a cooperative servo write system. Using an external software control program 84a running on the host 82, an internal firmware control program 84b embedded in the controller 68, or any suitable combination thereof, the servo write procedure of the invention can be performed using this cooperative system. The servo write procedure will produce multiple servo sectors 86 (examples of which are shown in FIGS. 3 and 5) on each recording surface of the disk platters 10a, 10b, 10c and 10d. In addition, for reasons which will become apparent below, there will usually be two servo write clock tracks (or other timing indicia) recorded on the disk assembly 10, typically on separate disk platters thereof that are respectively associated with the actuators 12 and 14. By way of example, a clock track associated with the actuator 14 is shown by reference numeral 88 in FIG. 2, and a clock track associated with the actuator 12 is shown by reference numeral 90 in FIG. 4. In lieu of the clock tracks 88 and 90, timing triggers or other timing indicia could be recorded.

A control cable 92 can be used to interconnect the disk file 2 to the servo write data processor 82 during servo write operations. The control cable 92 is detachably mounted at 94 to the disk file's normal host interface connector 96.

According to a preferred implementation of the control program 84, the disk file 2 is servo written using a two-part servo write procedure that includes a first servo write operation followed by a second servo write operation. Before either operation is performed, however, the disk file 2 must be placed in a servo write mode in a first step 100. This step can be initiated by way of a servo write mode select command sent by the host processor 82 to the controller 68. When the servo write mode is invoked, the disk file's normal data read/write and servo positioning functions will be overridden to allow servo writing. This is necessary insofar as the normal operating mode of the disk file 2 is designed to prohibit any data writes to servo sector regions of the disk assembly 10, which would render the disk file inoperable for normal use.

Figure 7A:
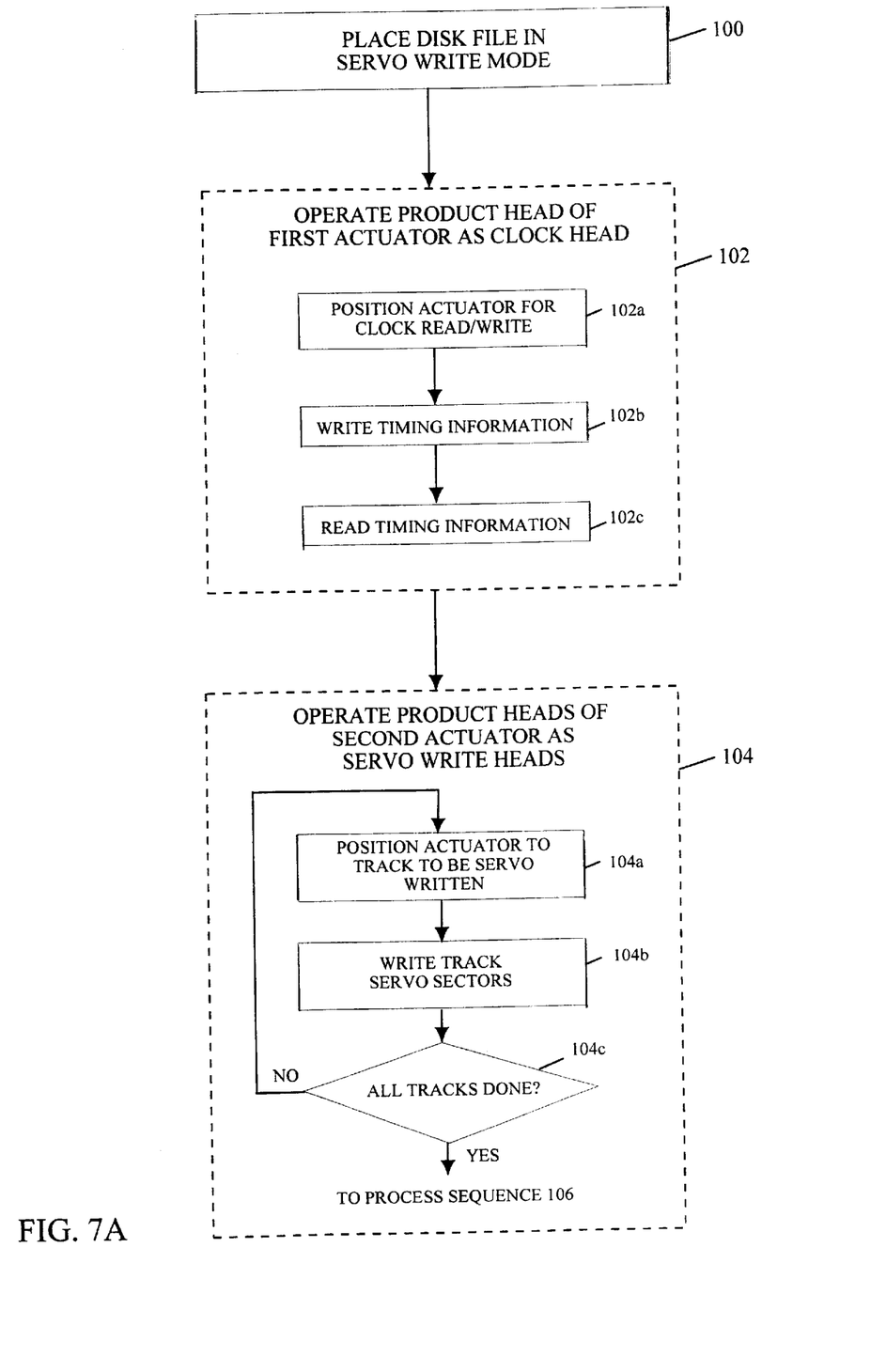
FIG. 7A is first portion of a flow diagram showing method steps used to servo write the disk file of FIG. 1 according to the invention.

The first servo write operation begins with a first process sequence, collectively referenced at 102 in FIG. 7A. According to the first process sequence 102, a product head of a first one of the actuators, e.g., the product head 30a of the actuator 14, is operated as a first clock head to generate first clock reference information. In particular, as shown in FIG. 2, the actuator 14 is rotated in step 102a until the product head 30a is positioned over the circumferential location 60 of the disk platter 10a (or at any other suitable location). This positioning can be accomplished by biasing the actuator 14 inwardly toward the drive spindle 8 until it engages the inner crash stop 54a or any other suitable positioning member. Alternatively, the actuator 14 can be positioned by servoing using conventional self-servoing techniques or pre-written servo information.

Once the product head 30a is positioned over the circumferential location 60, the product head is operated as the first clock head to generate the first timing information. This will typically include a timing information write step 102b, followed by a timing information read-back step 102c. As previously indicated, the timing information can be written using a variety of timing indicia. FIG. 2 illustrates use of the clock track 88 that lies along the circumferential location 60 of the disk platter 10a, within the disk platter's no-data zone 62. In step 102b, the product head 30a first writes the clock track 88, and then in step 102c reads back the clock track, thereby generating first clock reference information. Note that the clock track 88 could also be pre-written at an earlier stage of disk file manufacture, as could any other timing indicia used to generate the first clock reference information.

The first clock reference information generated in the first process sequence 102 is used to perform a second process sequence, collectively referenced at 104 in FIG. 7A. According to the second process sequence 104, the product heads of the second actuator are operated as servo write heads to perform servo writing of disk areas that are associated with the second actuator. FIG. 3 is illustrative. It shows the product head 26a of the actuator 12 writing servo data on a track-by-track basis to form servo sectors, such as the servo sector 86, on the upper surface of the disk platter 10c. The first clock reference information that is provided (simultaneously) by the actuator 14 is used to phase align these servo sectors. The remaining product heads 26b, 26c and 26d of the actuator 12 simultaneously perform corresponding servo data writes on their own respective surfaces of the disk platters 10c and 10d, all using the clock reference information provided by the actuator 14 for servo sector phase alignment.

The high level logic used to servo write each track of the disk platters 10a and 10b is shown in FIG. 7A. As illustrated, the product heads position to a track to be servo written in step 104a. Servo writing is then performed in step 104b. Step 104c causes steps 104a and 104b to repeat until all tracks of disk platters 10c and 10d are servo written.

Note that the servo write track positioning step 104a is preferably performed without the use of pushers or other external actuator positioning mechanisms that would require one or more access openings into the disk file 2 to engage the actuator 12. Instead, self positioning of the servo write products heads 26a–d is implemented using known techniques, such as by positioning the servo write product heads at sequential radial locations using variations in read back signal amplitude derived from previous servo written tracks.

Once the disk areas associated with the second actuator are servo written, the first servo write operation is complete and the second servo write operation is initiated. This operation begins with a third process sequence, collectively referenced at 106 of FIG. 7B. According to the third process sequence 106, a product head of the second actuator, e.g., product head 26a of the actuator 12, is operated as a second clock head to generate second clock reference information. In particular, as shown in FIG. 4, the actuator 12 is rotated in step 106a until the product head 26a is positioned over the circumferential location 60 of the disk platter 11c (or at any other suitable location). As in the case of the first servo write operation, this positioning can be accomplished by biasing the actuator 12 inwardly toward the drive spindle 8 until it engages the inner crash stop 52a or any other suitable positioning member. Alternatively, the actuator 12 can be positioned by servoing using conventional self-servoing techniques or pre-written servo information.

Once the product head 26a is positioned over the circumferential location 60, the product head is operated as the second clock head to generate the second timing information. As in the case of the first servo-write operation, this will typically include a timing information write step 106b, followed by a timing information read-back step 106c. As previously indicated, the timing information can be written using a variety of timing indicia. FIG. 4 illustrates use of the clock track 90 that lies along the circumferential location 60 of the disk platter 10c, within the disk platter's no-data zone 62. In step 106b, the product head 26a first writes the clock track 90, and then in step 106c reads back the clock track, thereby generating second clock reference information. Note that the clock track 90 could also be pre-written at an earlier stage of disk file manufacture, as could any other timing indicia used to generate the second clock reference information.

Figure 7B:
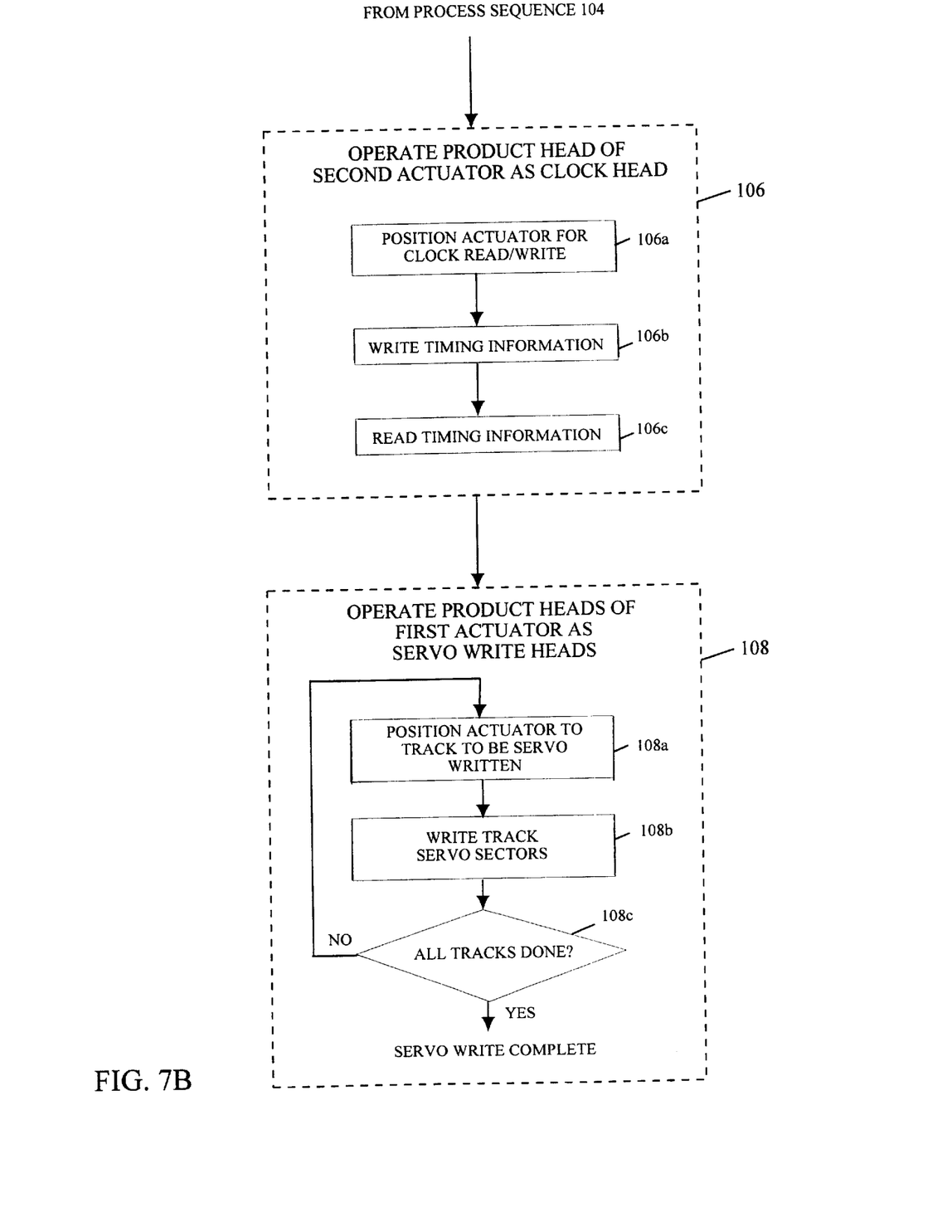
FIG. 7B is second portion of a flow diagram showing method steps used to servo write the disk file of FIG. 1 according to the invention.

The second clock reference information generated in the third process sequence 106 is used to perform a fourth process sequence, collectively referenced at 108 in FIG. 7B. According to the fourth process sequence 108, the product heads of the first actuator are operated as servo write heads to perform servo writing of disk areas that are associated with the first actuator. FIG. 5 is illustrative. It shows the product head 30a of the actuator 14 writing servo data on a track-by-track basis to form servo sectors, such as the servo sector 86, on the upper surface of the disk platter 10a. The second clock reference information that is provided (simultaneously) by the actuator 12 is used to phase align these servo sectors. The remaining product heads 30b, 30c and 30d of the actuator 14 simultaneously perform corresponding servo data writes on their own respective surfaces of the disk platters 10a and 10b, all using the clock reference information provided by the actuator 12 for servo sector phase alignment.

The high level logic used to servo write each track of the disk platters 10a and 10b is shown in FIG. 7B. As illustrated, the product heads position to a track to be servo written in step 108a. Servo writing is then performed in step 108b. Step 108c causes steps 108a and 108b to repeat until all tracks of disk platters 10a and 10b are servo written.

As in the case of the first servo write operation, the servo write track positioning step 108a is preferably performed without the use of pushers or other external actuator positioning mechanisms that would require one or more access openings into the disk file 2 to engage the actuator 14. Instead, self positioning of the servo write products heads 30a–d is implemented using known techniques, such as by positioning the servo write product heads at sequential radial locations using variations in read back signal amplitude derived from previous servo written tracks.

In implementations of the invention where the acting clock heads write their own clock tracks, it may be desirable to perform the second servo write operation according to a clock track synchronization procedure whereby the second clock head (e.g., the product head 26a in FIG. 4) writes the second timing information (e.g., the clock track 90 in FIG. 4), using the first timing information, such as the clock track 88 of FIG. 2. In that case, the first clock head (e.g., the product head 30a in FIG. 2 ) will read the first timing information while the second clock head (e.g., the product head 26a in FIG. 4) writes the second timing information in a predetermined tangential orientation relative to the first timing information. This will provide timing alignment between the actuators. As used herein, the term "tangential orientation" refers to how the servo sectors written by one actuator relate to the servo sectors written by another actuator relative to disk rotational timing. If the disk file 2 does not have a common timing reference, the servo sectors associated with each actuator could be randomly placed relative to each other, which may be undesirable. By way of example, there may be a design requirement that the respective servo sectors associated with each actuator be lined up so that both actuators are able to read their servo sectors at the same time. An alternative design requirement might be to have each actuator read its servo sectors in alternating fashion. By using the first timing information as a reference for generating the second timing information, such servo timing schemes can be readily implemented.

In some disk files, more than two actuators may be used. This is shown by way of example in FIG. 8, wherein a disk file 110 includes four actuators 112, 114, 116 and 118 that respectively access associated portions of a disk assembly 120. In that case, the first servo write operation will include operating a product head of a first one of the actuators, such as the actuator 116, as the first clock head that writes/reads timing information, such as a clock track 122, while the product heads of one or more of the plural remaining actuators, such as the actuators 112, 114 and 118, perform servo writing. The second servo write operation will then include operating one of the product heads already used for servo writing (e.g., a product head associated with actuators 112, 114 or 118) as a second clock head while the product heads of the first actuator (e.g., actuator 116) and any remaining actuators perform servo writing.

Figure 9:
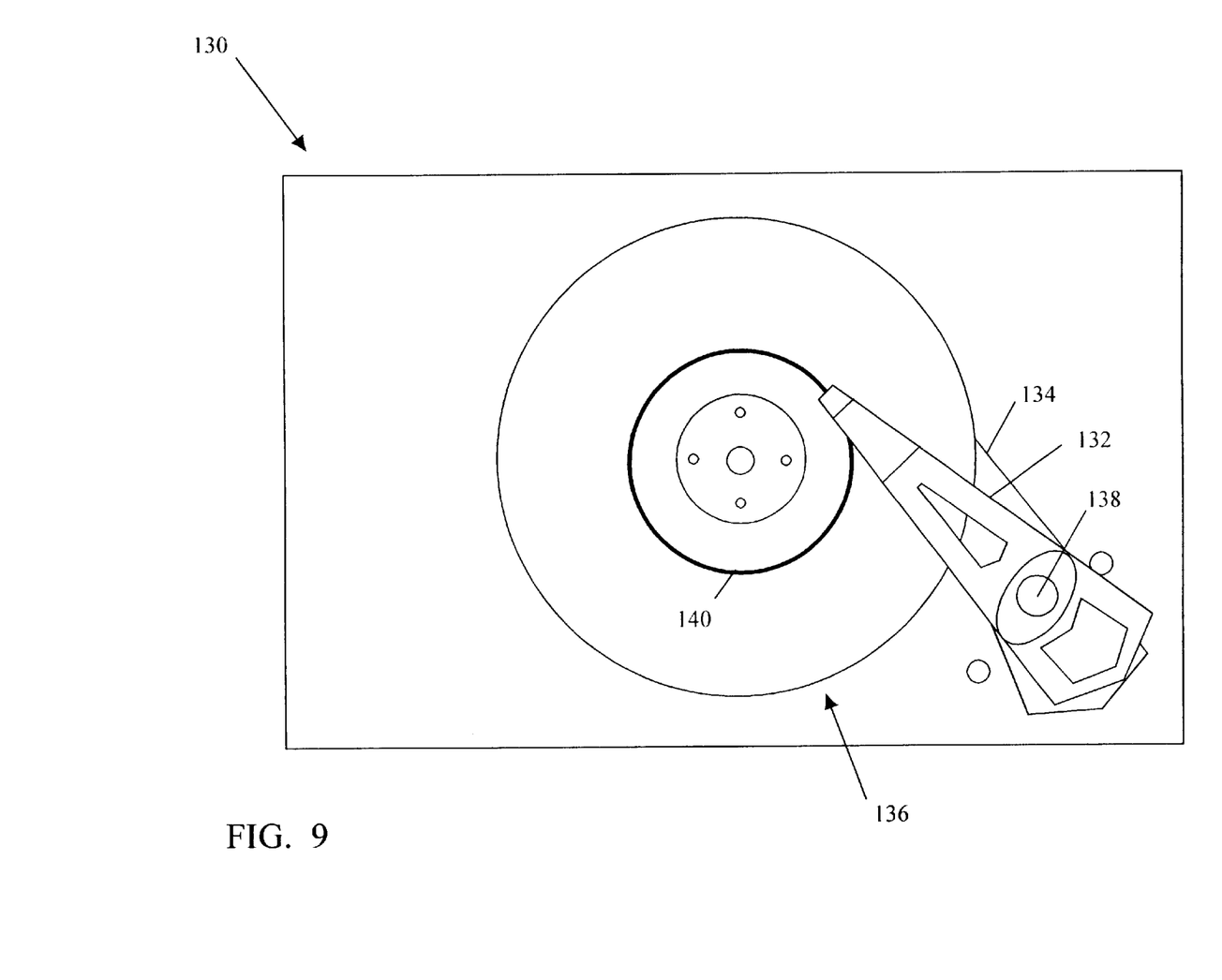
FIG. 9 is a simplified schematic plan view of a modified disk file showing the use of two actuators configured to pivot about a common axis of rotation.

FIG. 9 shows another alternative implementation wherein a disk file 130 includes upper and lower actuators 132 and 134 that respectively serve upper and lower sets of disk platters of a disk assembly 136, with the actuators being pivotally mounted on a common pivot shaft 138. Such a configuration is shown by way of example in commonly assigned U.S. Pat. No. 5,761,007, referenced by way of background above. In this configuration, the first servo write operation will include operating a product head of a first one of the actuators, such as the actuator 132, as the first clock head that writes/reads a clock track 140 on one of its associated disk platters, while the product heads of the plural remaining actuator, such as the actuator 134, perform servo writing. The second servo write operation will then include operating one of the product heads already used for servo writing (e.g., a product head associated with the actuator 134) as a second clock head while the product heads of the first actuator (e.g., actuator 132) perform servo writing.

Accordingly, a method for servo writing a multi-actuator disk file has been disclosed, along with a disk drive and servo write system. While various embodiments of the invention have been described, it should be apparent that many variations and alternative embodiments could be implemented in accordance with the invention. For example, in cases where the clock tracks are written within a disk file's data area, the first clock track can be overwritten with servo information after the first clock reference information is no longer needed, so that the first clock track area may be used for subsequent data storage. Moreover, in some disk files having suitable file electronics, the second clock track could be written into the data areas of a previously servo written track, so that the second clock track may then also be used for subsequent data storage. In combination, the foregoing modifications would result in a disk file having no clock tracks remaining on the media following the servo write procedure. It is understood, therefore, that the invention is not to be in any way limited except in accordance with the spirit of the appended claims and their equivalents.

What is claimed is:

1. A method for performing servo writing in a multi-actuator disk storage device having at least two actuators respectively mounting plural product heads, comprising the steps of:

performing a first servo write operation that includes:
operating a product head of a first one of said actuators as a first clock head to generate first clock reference information;
operating the product heads of a second one of said actuators as servo write heads to perform servo writing of all disk areas associated with said second actuator using said first clock reference information and actuator self-positioning; and performing a second servo write operation that includes:
operating a product head of said second actuator as a second clock head to generate second clock reference information;
operating the product heads of said first actuator as servo write heads to perform servo writing of all disk areas associated with said first actuator using said second clock reference information and actuator self-positioning.

2. A method in accordance with claim 1 wherein said clock reference information generating steps respectively include positioning said first and second clock heads at disk data area edges.

3. A method in accordance with claim 2 wherein said first and second clock heads are positioned by biasing the actuators which carry said clock heads against actuator crash stops or other positioning members.

4. A method in accordance with claim 2 wherein said first and second clock heads are positioned by servoing.

5. A method in accordance with claim 4 wherein said servoing is performed using pre-written timing information.

6. A method in accordance with claim 1 wherein said clock reference information generating steps respectively include controlling said first and second clock heads to write timing information to a disk area and thereafter read said timing information.

7. A method in accordance with claim 6 wherein said first servo write operation includes controlling said first clock head to write first timing information and said second servo write operation includes controlling said second clock head to write second timing information using said first timing information.

8. A method in accordance with claim 7 wherein said second clock head writes said second timing information in a predetermined tangential orientation relative to said first timing information to provide timing alignment between said actuators.

9. A method in accordance with claim 1 wherein said clock reference information generating steps respectively include controlling said first and second clock heads to read pre-written timing information.

10. A method in accordance with claim 1 wherein said disk drive includes more than two actuators and wherein:

said first servo write operation includes operating a product head of said first actuator as said first clock head while product heads of one or more remaining actuators perform servo writing; and said second servo write operation includes operating a product head already used for servo writing as said second clock head while product heads of said first actuator and any remaining actuators perform servo writing.

11. A disk drive having multiple actuators respectively mounting plural product heads that read and write information on associated disk areas, at least two of said disk areas having first and second timing information respectively recorded thereon and other of said disk areas having servo sectors recorded thereon according to a servo writing method that comprises the steps of:

performing a first servo write operation that includes:
operating a product head of one of said actuators as a first clock head to generate first clock reference information;
operating the product heads of a second one of the actuators as servo write heads to perform servo writing of all disk areas associated with said second actuator using said first clock reference information and actuator self-positioning; and performing a second servo write operation that includes:
operating a product head of said second actuator as a second clock head to generate second clock reference information;
operating the product heads of said first actuator as a servo write head to perform servo writing of all disk areas associated with said first actuator using said second clock reference information and actuator self-positioning.

12. A disk drive in accordance with claim 11 wherein said clock reference information generating steps respectively include positioning said first and second clock heads at disk data area edges.

13. A disk drive in accordance with claim 11 wherein said clock reference information generating steps respectively include controlling said first and second clock heads to write timing information to a disk area and thereafter read said timing information.

14. A disk drive in accordance with claim 13 wherein said first servo write operation includes controlling said first clock head to write first timing information and said second servo write operation includes controlling said second clock head to write second timing information using said first timing information.

15. A disk drive in accordance with claim 14 wherein said second clock head writes said second timing information in a predetermined tangential orientation relative to said first timing information to provide timing alignment between said actuators.

16. A disk drive in accordance with claim 11 wherein said clock reference information generating steps respectively include controlling said first and second clock heads to read pre-written timing information.

17. A disk drive in accordance with claim 11 wherein said disk drive includes more than two actuators and wherein:

said first servo write operation includes operating a product head of said first actuator as said first clock head while product heads of one or more remaining actuators perform servo writing; and said second servo write operation includes operating a product head already used for servo writing as said second clock head while product heads or said first actuator and any remaining actuators perform servo writing.

18. A disk drive in accordance with claim 11 wherein said first and second clock heads are positioned by biasing the actuators which carry said clock heads against actuator crash stop members or other positioning members.

19. A disk drive in accordance with claim 11 wherein said first and second clock heads are positioned by servoing.

20. A disk drive in accordance with claim 19 wherein said servoing is performed using pre-written timing information.

21. A system for servo writing a multiple actuator disk file, comprising:

a storage disk assembly in said disk file;

a first actuator in said disk file mounting plural product heads to access a first portion of said storage disk assembly;

a second actuator in said disk file mounting plural product heads to access a second portion of said storage disk assembly;

a controller in said disk file;

a programmable data processor external to said disk file and in communication with said controller;

a servo write control program;

a first set of control program instructions for performing a first servowrite operation that includes:
operating a product head of said actuator as a first clock head to generate first clock reference information;
operating the second product heads of said second actuator as servo write heads to perform servo writing of all of said second disk portion using said first clock reference information and actuator self-positioning; and a second set of control program instructions for performing a second servo write operation that includes:
operating a product head of said second actuator as a second clock head to generate second clock reference information;
operating the product heads of said first actuator as servo write heads to perform servo writing of all of said first disk portion using said second clock reference information and actuator self-positioning.

* * * * *